United States Patent
Jamil et al.

(10) Patent No.: US 9,528,540 B2
(45) Date of Patent: Dec. 27, 2016

(54) INSERTION-LOCKING PIN AND GROMMET AND RELATED METHODS

(71) Applicant: NEWFREY LLC, Newark, DE (US)

(72) Inventors: Oday Amer Jamil, Farmington Hills, MI (US); Terri Lynn Wernert, Lenox, MI (US); Tien The Diep, West Bloomfield, MI (US)

(73) Assignee: NEWFREY LLC, New Britain, CT (US)

( * ) Notice: Subject to any disclaimer, the term of this patent is extended or adjusted under 35 U.S.C. 154(b) by 115 days.

(21) Appl. No.: 14/457,195

(22) Filed: Aug. 12, 2014

(65) Prior Publication Data

US 2016/0047406 A1    Feb. 18, 2016

(51) Int. Cl.
*F16B 13/06*   (2006.01)
*F16B 21/07*   (2006.01)
*F16B 19/10*   (2006.01)

(52) U.S. Cl.
CPC ......... *F16B 13/063* (2013.01); *F16B 19/1081* (2013.01); *F16B 21/075* (2013.01); *F16B 21/073* (2013.01)

(58) Field of Classification Search
CPC . F16B 13/0858; F16B 13/0841; F16B 21/073; F16B 13/065; F16B 13/066; F16B 19/1045
USPC ............... 411/45–48, 54.1, 542, 60.1
See application file for complete search history.

(56) References Cited

U.S. PATENT DOCUMENTS

| | | | |
|---|---|---|---|
| 2,718,809 A * | 9/1955 | Kraft | F16B 13/063 411/46 |
| 6,364,586 B1 | 4/2002 | Okada | |
| 6,428,089 B1 * | 8/2002 | Noda | B60N 3/026 296/214 |
| 6,652,206 B2 * | 11/2003 | Heflin | F16B 19/1081 411/344 |
| 6,769,849 B2 | 8/2004 | Yoneoka | |

(Continued)

FOREIGN PATENT DOCUMENTS

| | | |
|---|---|---|
| EP | 2657545 | 10/2013 |
| JP | 2007056895 | 3/2007 |
| WO | WO2011049096 | 4/2011 |

OTHER PUBLICATIONS

International Search Report and Written Opinion dated Oct. 9, 2015 in corresponding PCT Application No. PCT/US2015/042642.
ITW Fastex Engineered Solutions literature (Apr. 2007).

*Primary Examiner* — Flemming Saether
(74) *Attorney, Agent, or Firm* — Harness, Dickey & Pierce, P.L.C.

(57) ABSTRACT

A pin and grommet fastener is assembled into a shipping configuration in which the pin is retained in a first position relative to the grommet with longitudinally extending leg members of the grommet in an unexpanded state. Cooperating members are provided on the pin and the grommet to engage each other in a locking configuration in which the pin is retained in a second position relative to the grommet causing the longitudinally extending leg members to be in a laterally expanded state. A driving member is provided on the pin to engage a periphery of an aperture of a joining part to cause the joining part to automatically drive the pin from the first position to the second position simultaneously with the insertion of the assembled pin and grommet into the aperture of the joining part.

19 Claims, 9 Drawing Sheets

(56) References Cited

U.S. PATENT DOCUMENTS

| | | |
|---|---|---|
| 6,817,817 B2 * | 11/2004 | Dembowsky ......... F16B 33/004 |
| | | 411/369 |
| 7,237,995 B2 | 7/2007 | Randez Perez et al. |
| 7,249,922 B2 | 7/2007 | Yoneoka |
| 7,484,919 B2 | 2/2009 | Hansen |
| 7,841,817 B2 | 11/2010 | Kawai |
| 9,011,058 B2 * | 4/2015 | Busch ................ F16B 19/1081 |
| | | 411/41 |
| 2005/0152764 A1 * | 7/2005 | Jackson ................ F16B 21/073 |
| | | 411/45 |
| 2010/0329815 A1 | 12/2010 | Jackson, Jr. et al. |
| 2013/0039717 A1 | 2/2013 | Sasaki |
| 2013/0071201 A1 | 3/2013 | Watanabe et al. |
| 2013/0091669 A1 | 4/2013 | Sasaki |
| 2013/0287517 A1 | 10/2013 | Fujiwara |
| 2014/0093325 A1 | 4/2014 | Mizukoshi et al. |

\* cited by examiner

INSERTION-LOCKING PIN AND GROMMET AND RELATED METHODS

FIELD

The present disclosure relates to pin and grommet fasteners and related methods, and to such fasteners and methods having particular applicability attaching a component to a base component and otherwise joining components or panels in the automotive industry.

BACKGROUND

This section provides background information related to the present disclosure which is not necessarily prior art.

Pin and grommet fasteners are commonly used in the automotive industry. Use of a pin and grommet fastener typically requires insertion of the grommet into an aperture of a joining part. The pin typically must additionally be both inserted into an aperture of the grommet and seated within the grommet aperture. Seating the pin within the grommet causes legs of the grommet to expand laterally and lock the pin and grommet to the joining part. Thus, in known grommet and pin fasteners, the pin typically must be seated within the grommet as a separate step or operation that must be done after the grommet is inserted into the aperture of the joining part.

In some cases, the pin can be assembled to the grommet with the pin retained in a partial, temporary, or shipping position within the grommet. This pin and grommet fastener assembly can then be shipped to a manufacturing plant. Thus, the end user need only handle a single assembly, and does not need to manage separate pin and grommet components. Such an assembly eliminates the need for the end user to initially insert the pin into the aperture of the grommet. Nevertheless, the pin and grommet assembly typically must still be inserted into the aperture of the joining part, and the pin must still be seated within the grommet as a separate step or operation that typically must be done after the pin and grommet assembly is inserted into the aperture of the joining part.

SUMMARY

This section provides a general summary of the disclosure, and is not a comprehensive disclosure of its full scope or all of its features.

In one aspect of the present disclosure, an insertion-locking pin and grommet fastener includes a grommet that defines a central aperture with at least two adjacent longitudinally extending leg members. A pin has a first locking member in the form of a recess or a protrusion that engages a first cooperating locking member of the grommet in the form of the other of a recess or a protrusion to retain the pin in a first position relative to the grommet in which the longitudinally extending leg members of the grommet are in a laterally unexpanded state. The pin has a second locking member in the form of a second protrusion that engages the at least two adjacent longitudinally extending leg members to retain the pin in a second position relative to the grommet in which the longitudinally extending leg members of the grommet are in a laterally expanded state. The pin has a laterally extending driving protrusion, wherein during insertion of the pin and grommet into a joining aperture of a joining part, the driving protrusion automatically engages a periphery of the joining aperture to drive the pin from the first position relative to the grommet to the second position relative to the grommet to lock the pin and grommet to the joining part.

In accordance with another aspect of the present disclosure method of manufacturing an insertion-locking pin and grommet fastener includes assembling a pin and a grommet into a shipping configuration in which the pin is retained in a first position relative to the grommet with longitudinally extending leg members of the grommet in a laterally unexpanded state. Cooperating members are provided on the pin and the grommet to engage each other in a locking configuration in which the pin is retained in a second position relative to the grommet with the longitudinally extending leg members of the grommet in a laterally expanded state. A driving member is provided on the pin to engage a periphery of an aperture of a joining part to cause the joining part to automatically drive the pin from the first position to the second position simultaneously with the insertion of the assembled pin and grommet into the aperture of the joining part.

In accordance with yet another aspect of the present disclosure, a method of insertion-locking a pin and grommet fastener to at least one joining part includes inserting the pin and grommet fastener that has been assembled into a first configuration in which the pin is retained in a first position relative to the grommet allowing longitudinally extending leg members of the grommet to be in a laterally unexpanded state into an aperture of the joining part. Simultaneously with the insertion of the assembled pin and grommet fastener into the aperture of the joining part, engaging a peripheral portion of the aperture of the joining part against a driving protrusion of the pin to drive the pin into a final locking configuration in which the pin is retained in a second position relative to the grommet and causes the longitudinally extending leg members of the grommet to be in a laterally expanded state. Inserting the pin and grommet fastener into the aperture of the at least one joining part automatically and completely locks the pin and grommet fastener to the at least one joining part.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
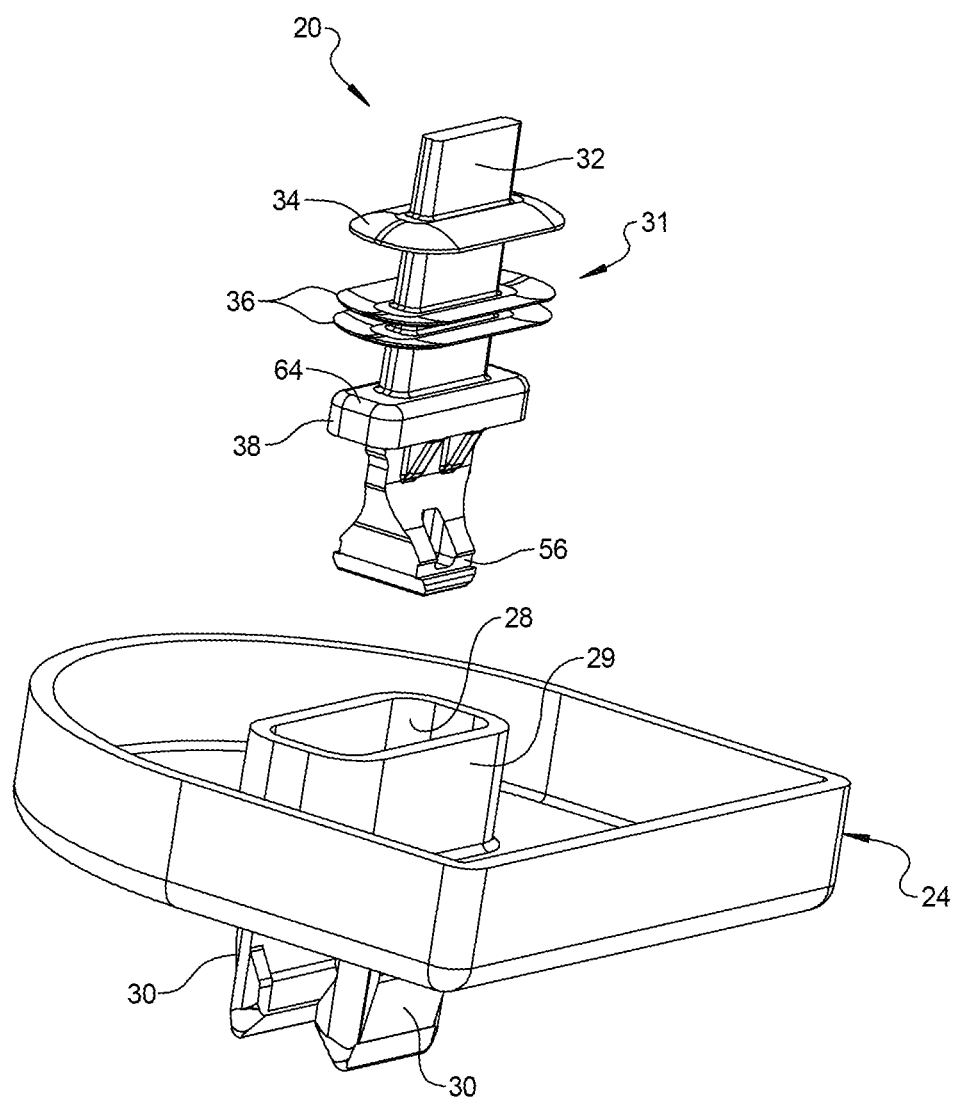
FIG. 1 is an exploded perspective view of one example of a pin and grommet fastener in accordance with the present disclosure.
Figure 2:
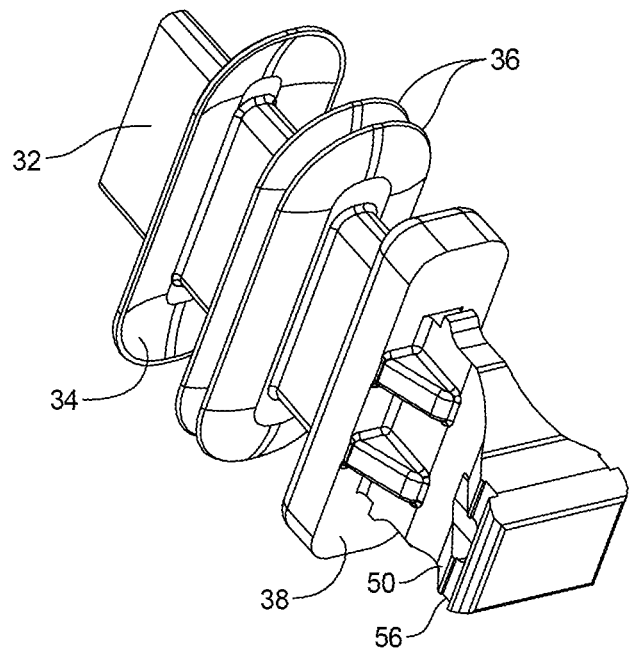
FIG. 2 is a perspective view of the pin and grommet fastener of FIG. 1.
Figure 3:
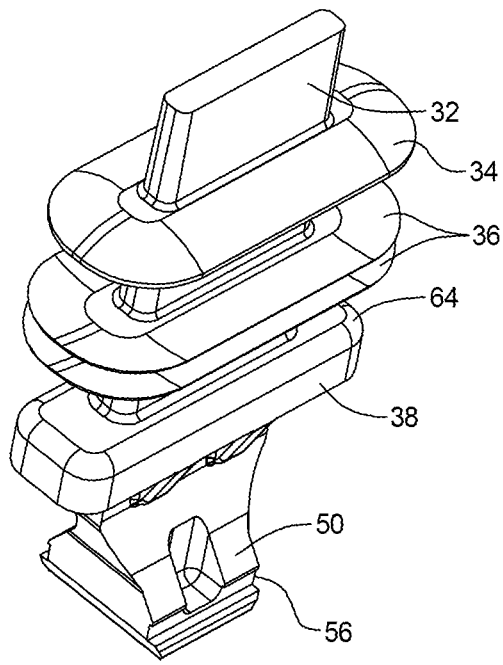
FIG. 3 is another perspective view of the pin and grommet fastener of FIG. 1.
Figure 4:
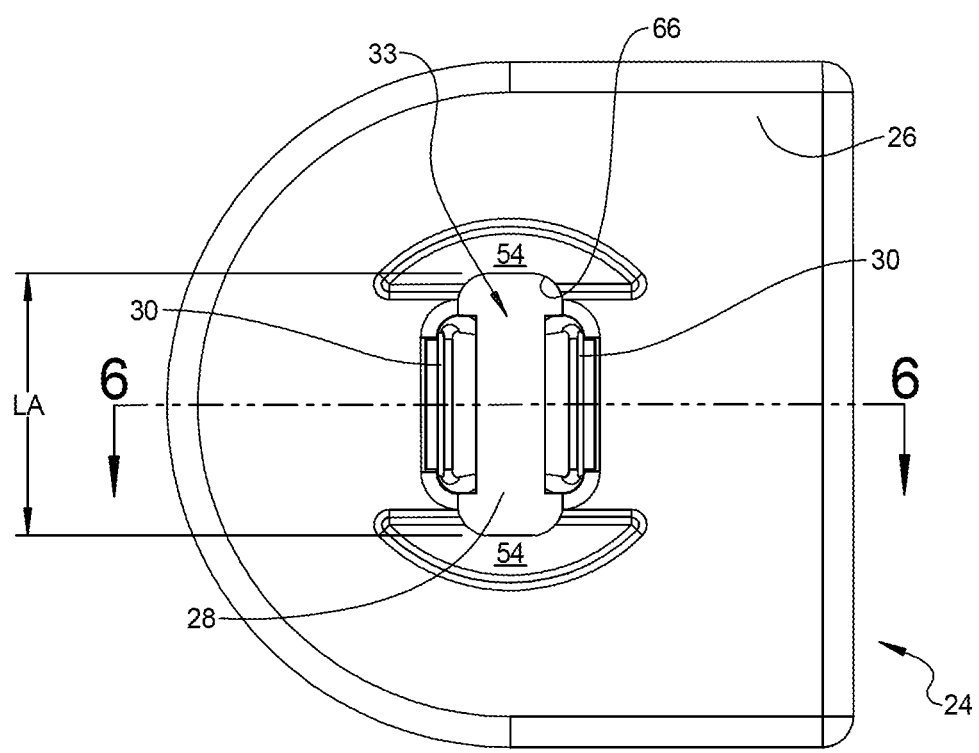
FIG. 4 is a top plan view of the grommet of the pin and grommet fastener of FIG. 1.
Figure 5:
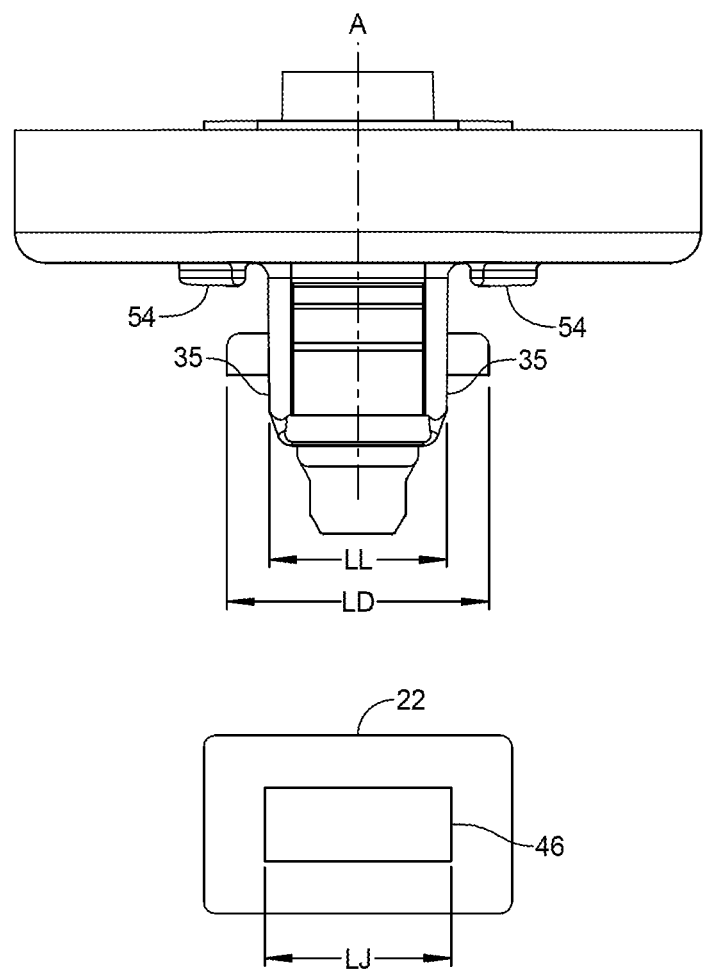
FIG. 5 is a side elevation view of the pin and grommet fastener of FIG. 1 with a top plan view of a joining part.

Example embodiments will now be described more fully with reference to the accompanying drawings.

Referring to FIGS. 1-11, one exemplary embodiment of a pin and grommet fastener 20 that locks simultaneously with insertion into a joining member or panel 22 is illustrated. The grommet 24 can be a separate fastener component, or can be integrally molded as part of a larger component that is to be fastened to the joining member 22. The grommet 24 can include a flange portion 26 and a central aperture 28 therethrough. Resilient or flexible leg members 30 extend longitudinally below the flange 26 (as oriented in the drawings) and adjacent the central aperture 28.

The pin 31 can include a removal grasping tab 32, a head 34, one or more sealing members 36, a locking member or bar 38, and a locking surface 56. The sealing members 36 can be molded to have an umbrella shape or can have a flat flange shape to seal inside a tubular portion 29 defining the aperture 28 and extending above the flange 26 (as oriented in the drawings). Such sealing members 36 can be molded of the same material as the remainder of the pin 31. As one possible alternative, the sealing member or members 36 can be molded of a more flexible material joined to the remainder of the pin 31, for example, using a two-shot molding process or an over-molding process.

Figure 6:
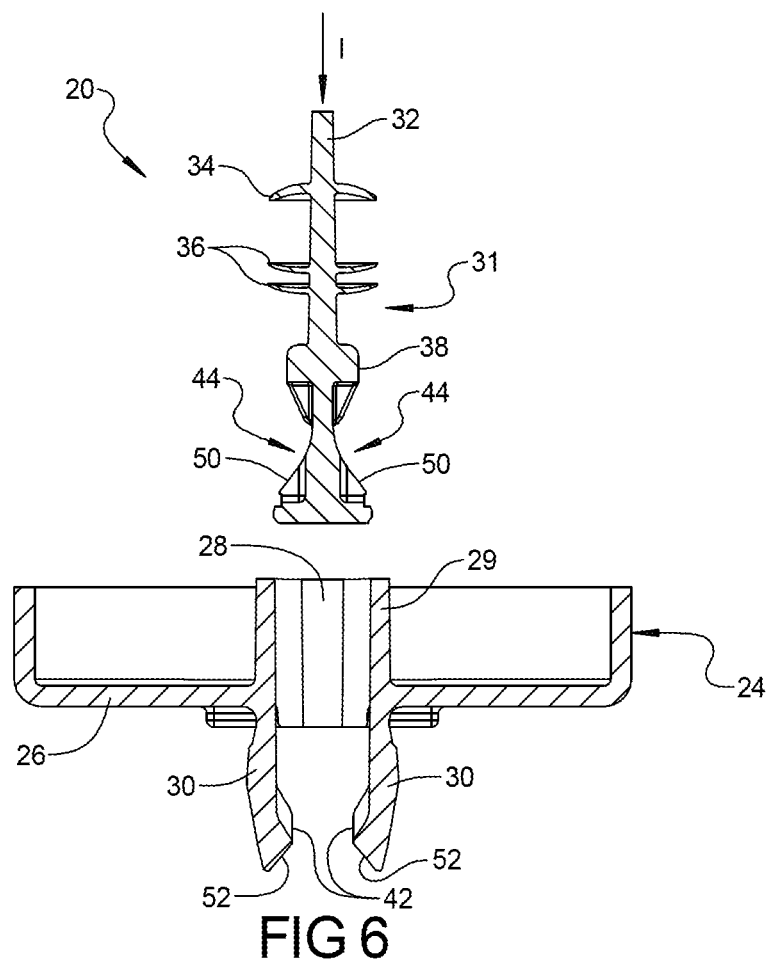
FIG. 6 is an exploded cross-sectional view of the pin and grommet fastener of FIG. 1.
Figure 7:
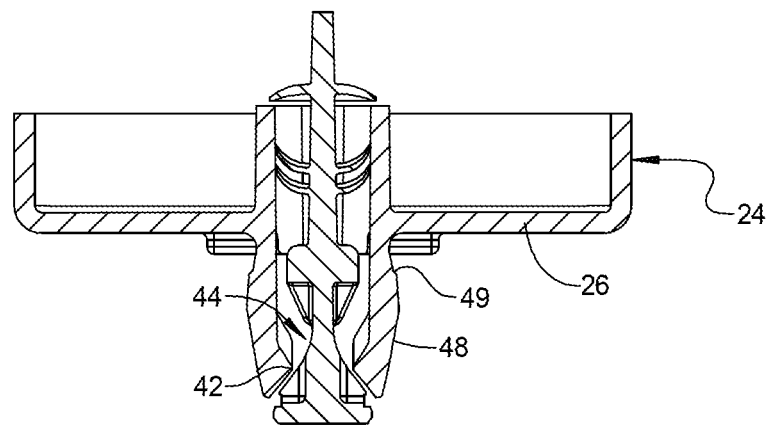
FIG. 7 is a cross-sectional view of the pin and grommet fastener of FIG. 1 in a first or shipping configuration.

The pin 31 can be inserted into the grommet 24 into a first, temporary, or shipping configuration as illustrated in FIG. 7. In this embodiment, the pin insertion end of the grommet aperture 28 is above the flange 26 as illustrated in the drawings. The head 34 prevents the pin from moving beyond the shipping position or configuration by engagement with the distal end of the tubular portion 29 defining the aperture 28. The pin 31 can be inserted into the aperture 28 of the grommet 24 in a first insertion direction "I" as seen in FIG. 6. This insertion direction extends in the axial or longitudinal direction of the central aperture 28 of the grommet 24.

Each longitudinally extending leg 30 includes a laterally inwardly extending protrusion 42 which fits into a cooperating recess or narrowed portion 44 of the pin 31. In this way, the pin 31 can be longitudinally positioned and retained relative to the grommet 24 in a shipping position or configuration with the legs 30 of the grommet 24 in their laterally unexpanded state. Alternatively, of course, the cooperating recess 44 could be provided via the legs 30 and a laterally outwardly extending protrusion 42 could be provided on the pin 31.

The locking bar 38 of the pin 31 can extend through the space or slots 33 between the legs 30 and past the sides 35 of the legs 30. Thus, the locking member 38 can have a lateral or side-to-side dimension that is greater than a corresponding dimension of the legs 30 so that the locking bar 38 extends past the legs 30. Since the locking bar 38 passes through the central aperture 28 during initial insertion of the pin 31 into the grommet 24 in this example embodiment, the aperture 28 likewise has a lateral or side-to-side dimension that is greater than a corresponding dimension of the legs 30. Alternatively, a pin without a head could be inserted from below the flange (as oriented in the drawings) so the locking member need not pass through the central aperture of the grommet.

The joining panel, part, or member 22 includes a joining aperture 46 into which the assembled pin and grommet fastener 20 is inserted. The joining aperture 46 into which the fastener 20 is to be inserted has a lateral or side-to-side dimension LJ that is less than a corresponding lateral dimension LD of the locking bar or member 38. A peripheral portion of the joining aperture 46 of the joining part 22 engages the locking member 38 and moves the locking member 38 in a locking direction indicated by arrow L as the pin and grommet fastener 20 is inserted into the joining aperture 46. Thus, the locking member operates as a driving protrusion 38 that a periphery of joining aperture 46 engages to move the pin 31 from the first, temporary, or shipping position to the second locked position relative to the grommet 24 simultaneously with insertion into the joining part 22.

Figure 12:
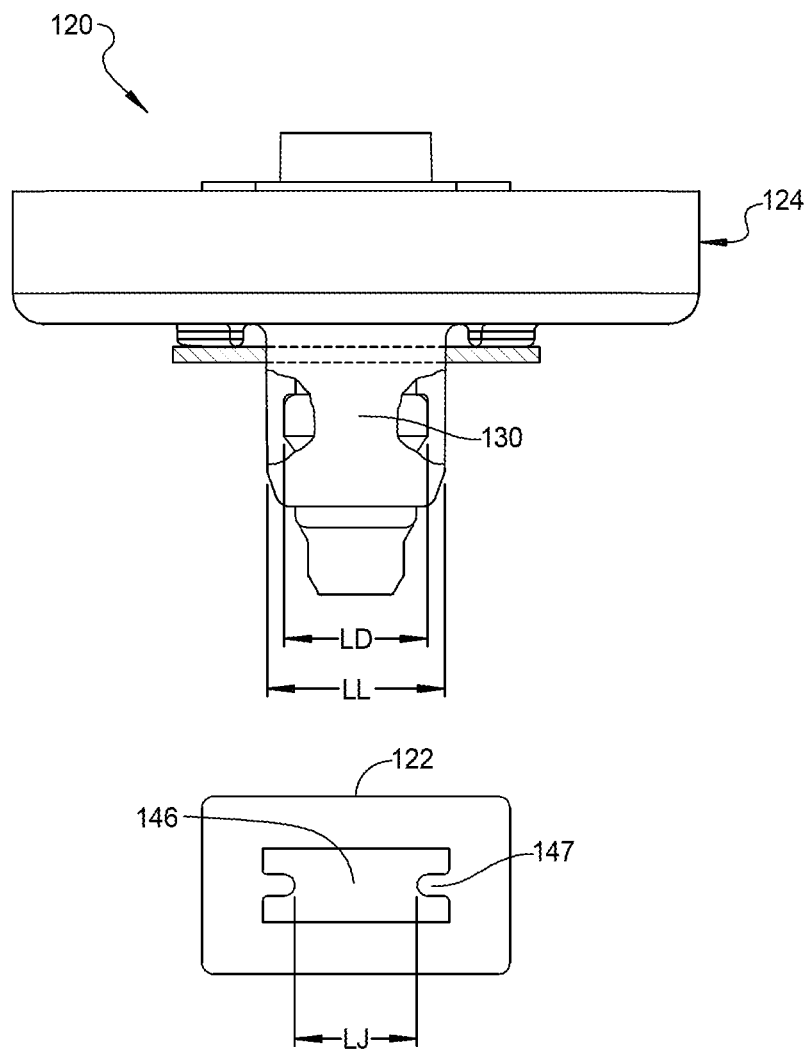
FIG. 12 is a side elevation view of another example of a pin and grommet fastener in accordance with this disclosure with a top plan view of another example of a joining part.

Referring to FIG. 12, other examples of a pin and grommet fastener 120, the joining aperture 146 can be shaped to have protrusions 147 that can extend into the space adjacent or between legs 130 of the grommet 124 to engage a corresponding driving protrusion 138 of the pin 131. In such alternative embodiments, the lateral dimension LD of the driving protrusion 138 need not be greater than a corresponding lateral dimension LL of the legs 130, but is still greater than the corresponding lateral dimension LJ of the joining aperture 146.

Returning to FIGS. 1-11, the pin and grommet fastener 20 can be assembled into a shipping configuration as illustrated in FIG. 7 and discussed herein. The pin and grommet fastener 20 can be in this shipping configuration when it is initially inserted into the joining part 22. An outer surface 48 of each leg 30 can have an outwardly convex or angled shape that is also referred to as a knuckle. The knuckle 48 can contact the edge of the joining aperture 46 during insertion, causing each leg 30 to move slightly in a laterally inwardly direction indicated by arrows LI in FIG. 8. This helps insure the pin 31 is properly positioned for insertion. If it is not, then the fastener 20 simply will not be able to be inserted into the joining aperture.

Figure 8:
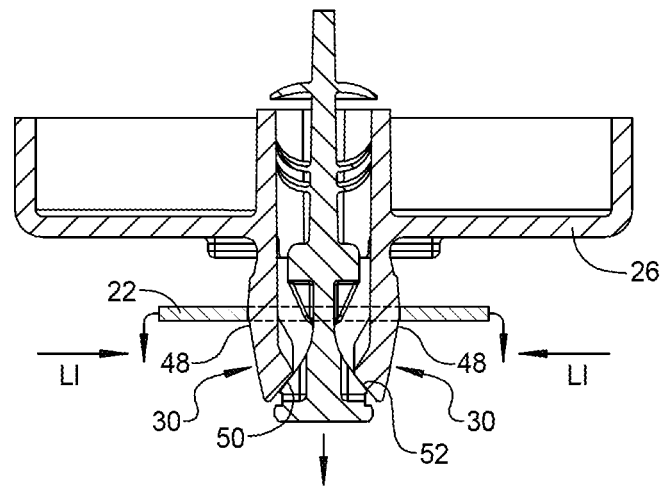
FIG. 8 is a cross-sectional view of the pin and grommet fastener of FIG. 1 with a joining part initially engaging the driving protrusion during insertion.
Figure 10:
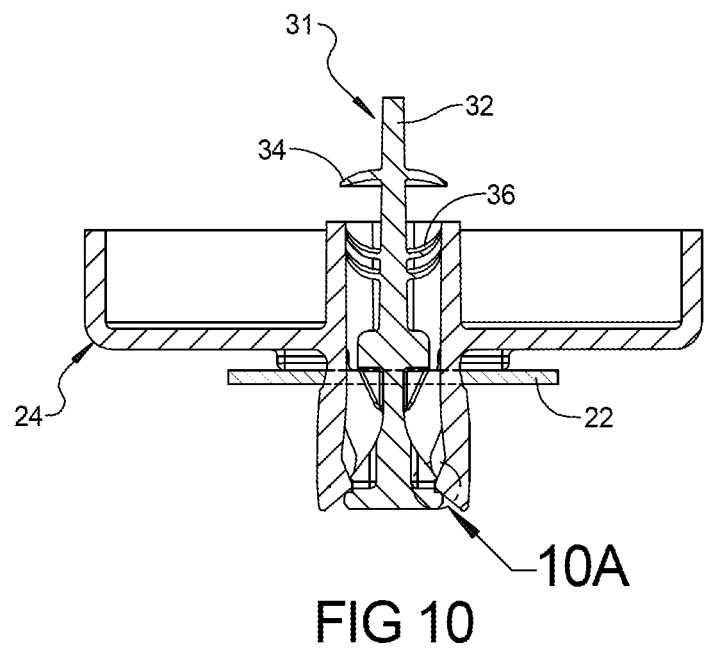
FIG. 10 is a cross-sectional view of the pin and grommet fastener of FIG. 1 with the pin in the second position relative to the grommet wherein the pin and grommet fastener is finally and fully locked to the joining part.
Figure 10A:
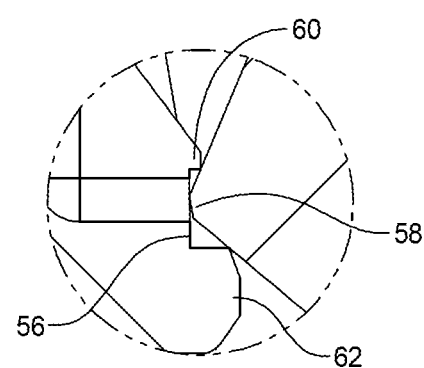
FIG. 10A is an exploded portion of FIG. 10.

As the legs 30 move laterally inwardly toward each other, cooperating or cam surfaces 50 and 52 can engage each other and can cause the pin 31 to move in the insertion direction as indicated in FIG. 8. If, however, the pin 31 is not in the shipping position and is instead positioned too far in the driving direction (such as illustrated in FIG. 10), then the fastener 20 will not be able to be inserted into the joining aperture 46. Not only can this provide an indication to the user that something is wrong, but it can also prevent the fastener 20 from being improperly inserted into the joining aperture 46 without being properly locked to the joining part 22. In addition, head 34 of the pin 31 can engage the grommet 24 to insure the pin 31 is not inserted too far in the insertion direction to further insure the pin 31 is in the shipping position.

Figure 9:
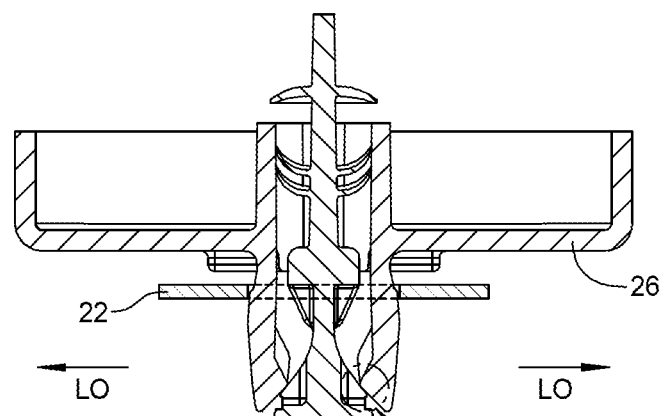
FIG. 9 is a cross-sectional view of the pin and grommet fastener of FIG. 1 with a joining part driving the pin toward the second position relative to the grommet during insertion.
Figure 9A:
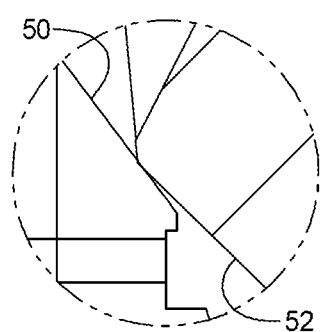
FIG. 9A is an exploded portion of FIG. 9.

As the periphery of the joining aperture 46 engages the driving protrusion 38 and causes the pin 31 to move in the locking direction (indicated by arrow L) relative to the grommet 24, cooperating or cam surfaces 50 and 52 operate to move the legs 30 of the grommet 24 in a laterally outward or expanded direction as indicated by arrows LO in FIG. 9. Continued insertion of the fastener 20 into the joining aperture continues to move the locking member or driving protrusion 38 until the pin 31 reaches a second, or fully-locked position relative to the grommet 24 as illustrated in FIG. 10. In this final or fully-locked position, the legs 30 are in their fully laterally expanded shape, preventing the fastener 20 from being withdrawn from the joining aperture 46.

In the second, fully-locked configuration as illustrated in FIG. 10, the joining member 22 can be held against a contact surface 54 of the grommet 24. The joining aperture 46 can be held or even biased against the contact surface 54 by, for example, an the end of the knuckle 48, which can include an undercut 49 providing the end of the knuckle 48 as a protrusion that presses against a surface of the joining part 22 defining the periphery of the joining aperture 46.

The cooperating locking surfaces 56 and 58 of the pin 31 and the legs 30, respectively, can additionally operate to hold the legs 30 in their laterally expanded or locked position. In the illustrated example, the cooperating locking surfaces 56 of the pin 31 are bounded by projections 60 and 62 that help retain the cooperating locking surface 58 of each leg 30 positioned adjacent the respective cooperating locking surface 56 of the pin 31. In the second, fully-locked position, the seal members 36 can be positioned within the tubular portion 28 to seal the central aperture 28 of the grommet 24.

The pin and grommet fastener 20 can automatically move into a final and locked, second configuration. In this context, "automatically" is used herein to mean that the fastener 20 is moved into the final and locked, second configuration simply as a result of the fastener 20 being inserted into the joining aperture 46. In other words, no additional or separate step or operation is required to fully or finally lock the fastener 20 to the joining part after inserting the assembled pin and grommet fastener 20 into the joining aperture 46. This is in contrast to pin and grommet fasteners, including screw and grommet fasteners, that require a grommet and pin or screw to be assembled or combined while they are within a joining aperture, and/or that require a pin or screw be manipulated relative to a grommet after insertion into a joining aperture.

The pin 31 can include a grasping removal tab or service tab 32. If there is ever a need to service the part, a user can grasp the service tab 32 and withdraw the pin 31 (upwardly in the figures) from the grommet 24. Such removal of the pin 31 allows the legs 30 to return to their original, laterally unexpanded shape, which allows the grommet to be withdrawn from the joining aperture 46 of the joining part 22. Thus, protrusion 62 can have a size and shape to resist the withdrawal of the pin 31 from the grommet 24 during normal use, but allow such withdrawal upon application of a sufficient force to the grasping removal tab 32. For example, a user may need to grasp the service tab 32 with needle nose pliers or a similar tool in order to apply a sufficient force to cause the locking surface 58 of the grommet 24 to move past the projection 62 of the pin 31.

Figure 11:
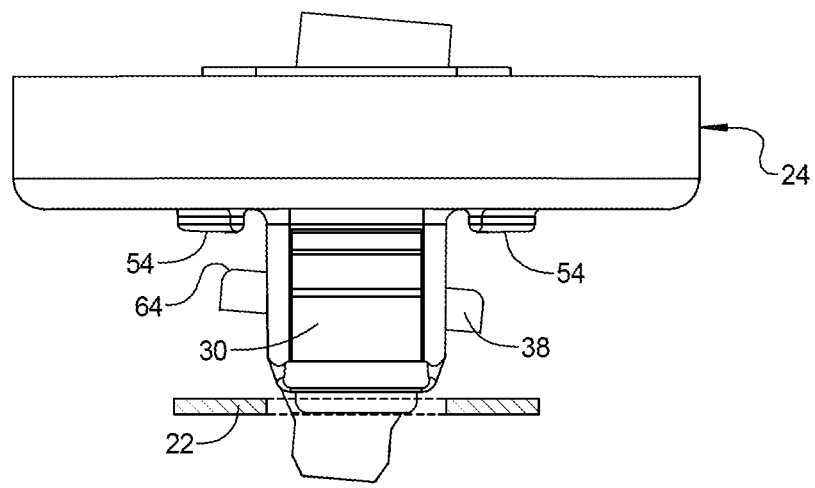
FIG. 11 is a side elevation view of the pin and grommet fastener of FIG. 1 in the shipping configuration with the pin canted or angled relative to the longitudinal axis of the central aperture initially engaging the joining part.

It may be possible for the pin to adopt a canted or angled position relative to the longitudinal axis of the central aperture 28 of the grommet 24 as illustrated in FIG. 11 during manufacturing, shipping or handling. As the fastener 20 is inserted into the joining aperture 46 of the joining part 22, it can exert an aligning force on the pin 31 via contact with a downwardly extending (as illustrated in the drawings) distal end of the driving member 38. As the fastener 20 is inserted into the joining aperture 46, the upwardly extending distal end of the driving member 38 can also engage a corresponding or adjacent edge of the central opening 28 of the grommet 24. A contacting surface 64 of the driving member 38 can have an outwardly convex or otherwise angled shape operating to center and longitudinally align the pin 31 through engagement with the corresponding edge of the central opening 28.

Related methods of manufacturing an insertion-locking pin and grommet fastener 20 should be apparent from the above discussion. For example, such methods can include providing the pin and grommet fastener 20 with any combination of the features described herein. Assembling the pin 31 and the grommet 24 into the shipping configuration can include inserting the pin 31 in an insertion direction (indicated by arrow I) into the central aperture 28 of the grommet 24 from a side of the grommet 24 that is opposite the flange 26 to the longitudinally extending leg members 30. Providing the laterally extending sealing members 36 can include molding the pin 31 in a two-shot molding process, where the laterally extending sealing members 36 are molded in a second shot of a material that is more flexible than a material of another portion of the pin 31 that is molded in a first shot. Similarly, an over-molding process can be used in which at least an exterior portion of the laterally extending sealing members 36 are molded over a less flexible material of another portion of the pin 31.

Similarly, related methods for insertion locking a pin and grommet fastener 20 into a joining part 22 should be apparent from the above discussion. For example, driving the pin 31 into the second, final locked configuration can position the laterally extending sealing members 36 to seal against a tubular portion 29 of the central aperture 28 of the grommet 24. Inserting the pin and grommet fastener 20 into the joining aperture 46 when the pin 31 is canted relative to a longitudinal axis of the central aperture 46 of the grommet 24 can engage an aligning surface 64 of the pin 31 against an edge 66 of the central aperture 28 of the grommet 24 to move the pin 31 into alignment with the longitudinal axis A of the central aperture 28. Inserting the pin and grommet fastener 20 into the joining aperture 46 can engage a shaped outer surface 48 of the leg members 30 of the grommet 24 to cause the leg members 30 to move laterally inwardly and engage adjacent cam surfaces 50 of the pin 31 and cooperating cam surfaces 52 of the leg members 30, respectively, to move the pin 31 in a direction away from the second position (indicated by arrow I).

Driving the pin 31 into the final locked configuration can engage opposing cam surfaces 50 of the pin 31 against a cooperating cam surface 52 of each longitudinally extending leg member 30 to move each longitudinally extending leg member 30 from the laterally unexpanded state to the laterally expanded state. In the final locked configuration cooperating locking surfaces, 56 and 58, of the pin 31 and each longitudinally extending leg member 30, respectively, engage against each other and can retain the longitudinally extending leg members 30 in the laterally expanded state via protrusions, 60 and 62 bounding at least one of the cooperating locking surfaces 56 and 58. Driving the pin 31 into the final locked configuration can engage an outer shaped surface 48 of the longitudinally extending leg members 30 against an outer face of the joining part 22 to bias the joining part 22 against the contact surfaces 54 of the grommet 24. For example, an undercut 49 can provide a surface that presses against the surface of the joining part 22 defining the periphery of the joining aperture 46.

The terminology used herein is for the purpose of describing particular example embodiments only and is not intended to be limiting. As used herein, the singular forms "a," "an," and "the" may be intended to include the plural forms as well, unless the context clearly indicates otherwise. For example, the joining part or member 22 is illustrated herein as a single small plate member. The joining part 22 may actually include a plurality of parts or plates each with apertures that together form the joining aperture 46 into which the pin and grommet fastener 20 is inserted. Additionally, the joining part 22 is not limited to the illustrated flat planar shape or small size, but can include virtually any desired shape or size.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, and/or sections, these elements, components, regions, and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An insertion-locking pin and grommet fastener comprising:
    a grommet defining a central aperture with at least two adjacent longitudinally extending leg members;
    a pin having a first locking member in the form of one of a recess and a protrusion that engages a first cooperating locking member of the grommet in the form of an opposite one of a recess and a protrusion to retain the pin in a first position relative to the grommet in which the longitudinally extending leg members of the grommet are in a laterally unexpanded state;
    the pin having a second locking member in the form of a second protrusion that engages a second cooperating locking member in the form of a second recess of the at least two adjacent longitudinally extending leg members to retain the pin in a second position relative to the grommet in which the longitudinally extending leg members of the grommet are in a laterally expanded state;
    the pin having a laterally extending driving protrusion, wherein the driving protrusion is designed to be automatically engageable against a periphery of a joining aperture of a joining part during insertion of the pin and grommet into the joining aperture to drive the pin from the first position relative to the grommet to the second position relative to the grommet to lock the pin and grommet to the joining part;
    wherein the insertion-locking in and grommet fastener comprises first and second separate, independent components, and wherein the first separate, independent component comprises the in and the second separate, independent component comprises the grommet.

2. The insertion-locking pin and grommet fastener of claim 1, wherein the pin comprises a head having a lateral dimension requiring the pin to be moved in an insertion direction as the in is initially inserted into the central aperture of the grommet and moved into the first position relative to the grommet.

3. The insertion-locking pin and grommet fastener of claim 2, wherein the second position of the pin relative to the grommet is in a driving direction from the first position that is opposite to the insertion direction.

4. The insertion-locking pin and grommet fastener of claim 1, wherein the pin comprises a laterally extending sealing member that seals the central aperture of the grommet when the pin is in the second position relative to the grommet.

5. The insertion-locking pin and grommet fastener of claim 4, wherein the laterally extending sealing member is a plurality of laterally extending sealing members sealing against a tubular portion of the central aperture of the grommet.

6. The insertion-locking pin and grommet fastener of claim 4, wherein the laterally extending sealing member comprises a material that is more resilient than a material of the pin.

7. The insertion-locking pin and grommet fastener of claim 4, wherein the laterally extending sealing member is a plurality of laterally extending flat umbrella sealing members sealing against a tubular portion of the central aperture of the grommet.

8. The insertion-locking pin and grommet fastener of claim 4, wherein the laterally extending sealing member is a plurality of laterally extending flat umbrella sealing members sealing against a tubular portion of the central aperture of the grommet and wherein the plurality of laterally extending flat umbrella sealing members comprise a material that is more resilient than a material of the pin.

9. The insertion-locking pin and grommet fastener of claim 1, wherein the pin comprises a service tab at a trailing end for grasping and removal of the pin from the grommet.

10. The insertion-locking pin and grommet fastener of claim 1, wherein the at least two leg members each comprise a knuckle defining an outer surface shaped to cause the at least two leg portions to move toward each other during insertion of the pin and grommet fastener into the joining aperture.

11. The insertion-locking pin and grommet fastener of claim 1, wherein the at least two leg members each comprise a knuckle defining an outer surface shaped to push against a face of the joining part to bias the joining part against a contact surface of the grommet when the pin is in the second position relative to the grommet.

12. The insertion-locking pin and grommet fastener of claim 1, wherein the laterally extending driving protrusion has an aligning surface shaped to engage an edge of the central aperture and move the pin toward an orientation in which the pin is aligned with a longitudinal axis of the central aperture of the grommet.

13. The insertion-locking pin and grommet fastener of claim 12, wherein the aligning surface has an outwardly convex shape.

14. The insertion-locking pin and grommet fastener of claim 1, wherein the driving protrusion has a lateral dimension that is greater than a corresponding lateral dimension of the longitudinally extending leg members.

15. The insertion-locking pin and grommet fastener of claim 1, wherein the first locking member of the pin is in the form of a recess, and the first cooperating locking member of the grommet is in the form of a protrusion.

16. The insertion-locking pin and grommet fastener of claim 15, wherein the recess of the pin is partially defined by a cam surface, and the protrusion of the grommet is partially defined by a cooperating cam surface, wherein the cam surface and the cooperating cam surface engage each other to cause the longitudinally extending leg members to move toward the laterally expanded state as the pin moves toward the second position.

17. The insertion-locking pin and grommet fastener of claim 16, wherein the pin includes a locking surface adjacent the cam surface and the longitudinally extending leg members include a cooperating locking surface adjacent the cooperating cam surface to engage each other and retain the leg members in their laterally expanded state when the pin is in the second position.

18. The insertion-locking pin and grommet fastener of claim 1, wherein the pin further comprises a head having a lateral dimension requiring the pin to be moved in an insertion direction as the pin is initially inserted into the central aperture of the grommet and moved into the first position relative to the grommet and a service tab extending from the head and forming a trailing end for grasping and removal of the pin from the grommet.

19. An insertion-locking in and grommet fastener comprising:
a grommet defining a central aperture with at least two adjacent longitudinally extending leg members;
a pin having a first locking member in the form of one of a recess and a protrusion that engages a first cooperating locking member of the grommet in the form of an opposite one of a recess and a protrusion to retain the in a first position relative to the grommet in which the longitudinally extending leg members of the grommet are in a laterally unexpanded state;
the pin having a second locking member in the form of a second protrusion that engages a second cooperating locking member in the form of a second recess of the at least two adjacent longitudinally extending leg members to retain the pin in a second position relative to the grommet in which the longitudinally extending leg members of the grommet are in a laterally expanded state;
the pin having a laterally extending driving protrusion, wherein the driving protrusion is designed to be automatically engageable against a periphery of a joining aperture of a joining part during insertion of the in and grommet into the joining aperture to drive the in from the first position relative to the grommet to the second position relative to the grommet to lock the in and grommet to the joining part;
wherein the driving protrusion has a lateral dimension that is substantially the same as a corresponding lateral dimension of the central aperture.

\* \* \* \* \*

UNITED STATES PATENT AND TRADEMARK OFFICE
CERTIFICATE OF CORRECTION

PATENT NO. : 9,528,540 B2  
APPLICATION NO. : 14/457195  
DATED : December 27, 2016  
INVENTOR(S) : Oday Amer Jamil et al.

Page 1 of 1

It is certified that error appears in the above-identified patent and that said Letters Patent is hereby corrected as shown below:

In the Claims

Column 8, Claim 1, Line 31, delete "in" and insert --pin--.

Column 8, Claim 1, Line 34, delete "in" and insert --pin--.

Column 8, Claim 2, Line 39, delete "in" and insert --pin--.

Column 10, Claim 19, Line 15, delete "in" and insert --pin--.

Column 10, Claim 19, Line 22, delete "in" and insert --pin--.

Column 10, Claim 19, Line 38, delete "in" and insert --pin--.

Column 10, Claim 19, Line 39, delete "in" and insert --pin--.

Column 10, Claim 19, Line 41, delete "in" and insert --pin--.

Signed and Sealed this  
Sixteenth Day of May, 2017

Michelle K. Lee  
*Director of the United States Patent and Trademark Office*